United States Patent [19]

Tsumura et al.

[11] Patent Number: 5,357,505
[45] Date of Patent: Oct. 18, 1994

[54] DEVICE FOR BIDIRECTIONAL COMMUNICATION ON A TELEPHONE LINE

[75] Inventors: Mihoji Tsumura; Shinnosuke Taniguchi, both of Osaka, Japan

[73] Assignee: Ricos Co., Ltd., Osaka, Japan

[21] Appl. No.: 860,058

[22] Filed: Mar. 30, 1992

[51] Int. Cl.$^5$ .................................. H04Q 11/04
[52] U.S. Cl. ........................... 370/60; 370/94.1
[58] Field of Search ............ 370/94.1, 60, 58.1, 370/58.2, 58.3, 60.1, 94.2, 94.3, 110.1

[56] References Cited

U.S. PATENT DOCUMENTS

| | | | |
|---|---|---|---|
| 4,787,085 | 11/1988 | Suto et al. | 370/110.1 |
| 4,998,248 | 3/1991 | Matsuzaki | 370/94.1 |
| 5,097,466 | 3/1992 | Kammerl | 370/94.1 |

*Primary Examiner*—Douglas W. Olms
*Assistant Examiner*—Ajit Patel
*Attorney, Agent, or Firm*—Thompson, Hine and Flory

[57] ABSTRACT

An idle time communication device in which communication windows are created during the transmission of broadcast data from a center unit to a user's home device, the windows being designated to augment the data transmission function by enabling one-to-one bidirectional communication between the center and the user's home. The invention assumes the prior existence of a communication device for the transmission of broadcast data from the independent center through the telephone network to the user's home and achieves its object of one-to-one bidirectional communication between the center and the user's home through the use of packet communication which is carried out during the idle time on the telephone network, which connects the switching system of the local telephone exchange with the telephone in the user's home. The invention enables both the transmission of download data from a control unit to a specified terminal and the transmission of upload data from a specified terminal to a control unit without confusion between terminals in either case. This enables, for example, (a) a control device to transmit download data to a specified terminal and for the due arrival of the download data to be confirmed at the center by the return of upload data from the terminal, (b) the center to receive music requests and instructions in the form of upload data from a terminal, and (c) the creation of a protocol that will enable error-free communication to be carried out between the control device and terminal.

8 Claims, 1 Drawing Sheet

DEVICE FOR BIDIRECTIONAL COMMUNICATION ON A TELEPHONE LINE

BACKGROUND OF THE INVENTION

1. Field of the Invention

The invention relates to a communication device that communicates between an independent center and a user's home by making use of the idle time on a telephone network which connects the switching system of the local telephone exchange and the telephone in said user's home.

2. Description of the Prior Art

Telephone communication normally involves the connection of the switching system of a telephone exchange and a user's telephone through the medium of a telephone network. When the telephone receiver is lifted off the hook, a loop is formed with between the telephone and the exchange's switching system by way of the telephone network and voice communication is made possible by the transmission of signals around said loop.

There are known communication devices which make use of a network's idle time for the unidirectional transmission of broadcast data in the form of, for example, music data to the user's home. This type of communication device calls for the installation in a telephone exchange of an exchange device which is used to switch the telephone network selectively between the switching system of the exchange itself and a facility installed in an independent center for the transmission of analog data in the form of speech or music. Each user's home is fitted with a home device with a speaker, which is connected to the telephone network and which, when the receiver is lifted off the hook, connects the exchange device to the exchange's switching system itself to enable voice communication and, when the receiver is placed on the hook, switches the exchange device to said independent center From which broadcast data is transmitted by way of the telephone network to users' home devices. In practice, a plurality of center units are normally connected to a single exchange device which can be turned on and off or switched selectively between said center units (to select different broadcast data channels) by the remote operation of the user' home devices.

However, a communication device, which makes use of idle time in this way, enables unidirectional one-to-many communication only from a center unit to a plurality of home devices. Home devices, on the other hand, have been confined to the remote switching of the exchange device on and off and the remote selection of center units. It has not, however, been possible for data to be channeled to a specific user from a center nor for a specific user to transmit information in data form to a center. It has thus been impossible, for example, either to (a) transmit data from a center to a specified user and to confirm the due arrival of said data by the return of data from said user to said center, or to (b) transmit requests for specific pieces of music or instructions in data form from a user's home to a center, or to (c) create a protocol to enable error-free transmission up and down between centers and users.

SUMMARY OF THE INVENTION

The invention relates to an idle time communication device in which communication windows are created during the transmission of broadcast data from a center unit to a user's home device, said windows being designed to augment the data transmission function by enabling one-to-one bidirectional communication between said center and said user's home.

The present invention assumes the prior existence of a communication device for the transmission of broadcast data From said independent center through the telephone network to said user's home and achieves its object of one-to-one bidirectional communication between said center and said user's home through the use of packet communication which is carried out during the idle time on said telephone network, which connects the switching system of the local telephone exchange with the telephone in said user's home.

More specifically, the configuration of a system according to the present invention calls for the installation in a center of a control device which outputs download data and control signals and inputs upload data, a first packet transmission unit which converts download data received from said control device into packet form, a data switching unit which accepts packets output from the first packet transmission unit and also broadcast data and, in response to a control signal from the control device, outputs either said packet or said broadcast data selectively to the telephone network, a first packet receiving unit which, on receipt of signals from the telephone network, selects packets addressed to the control unit, extracts upload data from said packets and outputs said data to the control unit, and a first communication sequence controller which controls the sequence of communications of the first packet transmission unit and the first packet receiving unit. The configuration of a system according to the present invention also calls for the installation in a user's home of a terminal for the output of upload data and the input of download data, a second packet transmission unit which converts upload data received from said terminal into packet form and outputs said packets to the telephone network, a second packet receiving device which, on receipt of signals from said telephone network, selects packets addressed to the terminal, extracts download data from said packets and outputs said data to the terminal, and a second communication sequence controller which controls the sequence of communications of the second packet transmission unit and the second packet receiving unit.

The adoption of the above configuration makes one-to-one bidirectional communication possible and, in so doing, also enables both the transmission of download data from a control unit to a specified terminal and also the transmission of upload data from a specified terminal to a control unit, without confusion between terminals in either case. With this configuration it would be possible, for example, for (a) a control device to transmit download data to a specified terminal and for the due arrival of said download data to be confirmed at the center by the return upload of data from said terminal, (b) for the center to receive music requests and instructions in the form of upload data from a terminal, and (c) for a protocol to be created that would enable error-free communication to be carried out between control device and terminal.

DETAILED DESCRIPTION OF THE PREFERRED EMBODIMENT

Figure 1:
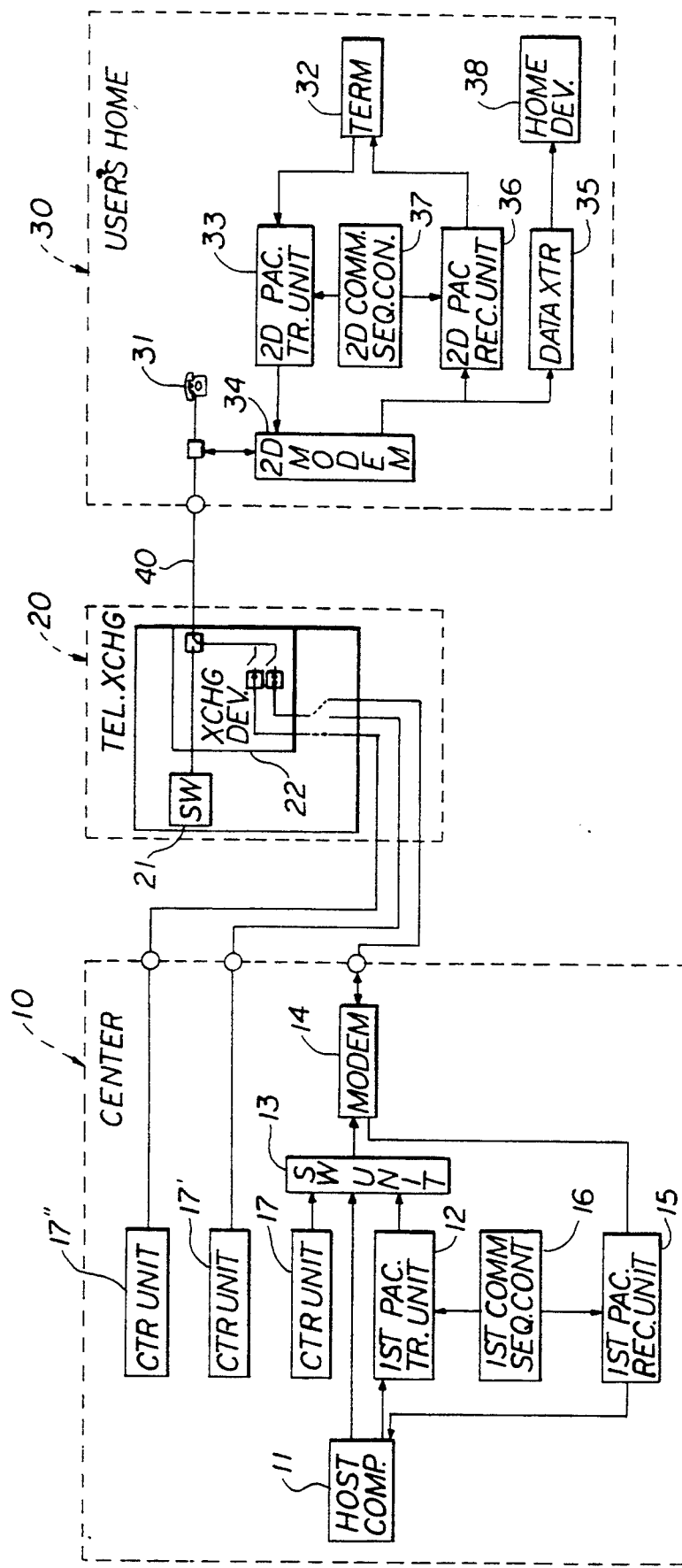
FIG. 1 is a block diagram illustrating the configuration of the whole of the preferred embodiment.

There follows a detailed description of the preferred embodiment of the invention by reference to the accompanying drawing.

FIG. 1 illustrates the preferred embodiment of the communication device of time invention. In the figure, 20 is a telephone exchange incorporating a switching system 21 and 30 is a user's home which is fitted with a telephone 31, said switching system 21 being connected to said telephone 31 by way of a telephone network 40 made up of analog lines. By lifting the receiver of the telephone 31 off the hook, a loop is formed between said telephone 31, the switching system 21 and the telephone network 40, the transmission of speech signals around said loop making conversation possible.

10 is a center independent of the telephone exchange 20, said center 10 being equipped with three center units 7, 17′,17″, each of which transmits analog data in the form of, for example, speech or music. 11 is a host computer, which functions as a controller, handling the output of download data and control signals and the input of upload data. The telephone exchange is fitted with an exchange device 22 which is able to switch selectively between the exchange's switching system 21 and the three center units 17, 17′, 17″ in order to connect them to the telephone network 40. The user's home is also fitted with a terminal 32 and a home device 38 with a speaker, each of which is connected to the telephone network 40. Said terminal 32 comprises a MIDI sound source, which is driven by MIDI data, and a visual display unit, and handles the output of upload data and the input of download data.

The system outlined above is configured in such a way that, when the telephone receiver is lifted off the hook, the exchange device 22 is switched to the exchange's switching system to enable speech communication and, when the telephone receiver is placed on the hook, the exchange device 22 is switched over to the center unit side to enable each of the three center units 17, 17′, 17″ to make use of telephone network 40 idle time for the transmission of analog data to the home unit 38 by way of the telephone network 40. The exchange device can, moreover, be turned on and off and the center units 17, 17′, 17″ can be individually selected (change of channel) by the remote operation of the home device 38.

There now follows an explanation of the relationship between the host computer 11 and first center unit 17 and the terminal 32 and home device 38. The center 10 itself is equipped with the following elements.

1/ First Packet Transmission Unit 12

The first packet transmission unit 12 converts download data output by the host computer 11 into packets. More specifically, it splits up said download data, inserts flags, identifiers, control data and error control codes and then reassembles it into packet form.

2/ Data Switching Unit 13

The data switching unit 13 receives output (packets) from the first packet transmission unit 12 and broadcast data from the first center unit 17, selectively outputting either the former or the latter on receipt of a control signal from the aforementioned host computer 11. In other words, it switches between broadcast data and communication data in order to create communication windows in the flow of broadcast data. It also prevents the reading in of broadcast data during the transmission of communication data.

3/ First Modem Section 14

The first modem section 14 receives packet or broadcast data output by the data switching unit 13, modulates it into analog signal form and outputs it to the telephone network 40, while at the same time receiving analog signals from said telephone network 40 which it demodulates into digital signal form. The first modem section 14 carries out full duplex transmission.

4/ First Packet Receiving Unit 15

The first packet receiving unit 15 receives outpost from the first modem section 14 in the form of digital signals from which it selects packets addressed to the control device, extracts upload data and outputs it to the host computer 11. Said upload data consists both of communication data and of communication sequence control data.

5/ First Communication Sequence Controller 16

The first communication sequence controller 16 controls the first packet transmission unit 12 and the first packet receiving unit 15 in such a way as to ensure that the transmission and receipt of packet data is carried out in accordance with a specified protocol. The controller's specification will vary depending on the type of protocol used. On receipt of a packet which is found to be free from errors, for example, a positive acknowledge packet may be transmitted while, on receipt of a packet in which an error is detected, a negative acknowledge packet may be transmitted to request retransmission of the original packet. It is thus possible, through the use of transmission control packets, to ensure the trouble-free transmission of data.

The user's home is in turn equipped with the following elements.

6/ Second Packet Transmission Unit 33

The second packet transmission unit 33 converts upload data output by the terminal 32 into packets. More specifically, it splits up said upload data, inserts flags, identifiers, control data and error control codes and then reassembles it into packet form.

7/ Second Modem Section 34

The second modem section 34 receives packet data output by the second packet transmission unit 33, modulates it into analog signal form and outputs it to the telephone network 40, while at the same time receiving analog signals from said telephone network 40 which it demodulates into digital signal form. The second modem section 34 carries out full duplex transmission.

8/ Broadcast Data Extractor 35

The broadcast data extractor 35 extracts broadcast data from the digital data output received from the second modem section 34.

9/ Second Packet Receiving Unit 36

The second packet receiving unit 36 receives output from the second modem section 34 in the form of digital signals from which it selects packets addressed to the terminal 32, extracts download data and outputs it to said terminal 32. Said download data consists both of communication data and of communication sequence control data.

10/ Second Communication Sequence Controller 37

The second communication sequence controller 37 corresponds to the aforementioned first communication sequence controller 16 and controls the operation of the second packet transmission unit 33 and the second packet receiving unit 36.

The sort of download data that could be transmitted from the host computer 11 to the terminal 32 includes
(1) Karaoke music data (MIDI data) and image data.
(2) Usage charge data
(3) List of music titles.

The sort of upload data that could be transmitted from the terminal 32 to the host computer 11 includes the following.
(I) Confirmation signal from the terminal 32 to confirm that download data from the host computer 11 has duly arrived at said terminal 32.
(II) Music request signal requesting download of specified music and image data.
(III) ID signal from the terminal 32 to confirm the identity of said terminal 32, thereby simplifying the terminal control operations carried out by the center 10.
(IV) fault signal from the terminal 32 to advise the center 10 that a fault state has occurred in said terminal 32.
(V) Operation signal from the terminal 32 to advise the center 10 of the operating status of said terminal 32.

By using the configuration outlined above, it is possible to make use of the idle time on the telephone network 40, when the receiver is placed on the hook, for example, for the transmission of broadcast data from the center 10 to the user's home 30 by way of the telephone network 40. In this case, when the system is switched to the first center unit 17, bidirectional communication is carried out between the host computer 11 and the terminal 32. More precisely, download data from said host computer 11 is converted to packet data form in the first packet transmission unit 12. The data switching unit 13 then selects either said packet data or the aforementioned broadcast data and outputs the selected data to the first modem section 14 where it is modulated into analog signal form and output to the telephone network 40. On receipt at the user's home 30, said analog signals are demodulated in the second modem section 34 into the form of digital signals from which broadcast data is then extracted by the broadcast data extractor 35 and output to the home device 38 and packet download data addressed to the terminal 32 is extracted by the second packet receiving unit 36 and output to said terminal 32.

Upload data from the terminal 32, on the other hand, is converted to packet data form by the second packet transmission unit 33 after which it is modulated by the second modem section 34 into the form of analog signals which are output to the telephone network 40. On receipt by the center 10, said analog signals are converted by the first modem section 14 back into the form of digital signals from which upload data packets addressed to the host computer 11 are then extracted by the first packet receiving unit 15 and output to said host computer 11.

Thus, since the adoption of the configuration outlined above enables one-to-one bidirectional communication between the host computer 11 and the terminal 32, this means that both the transmission of download data from the host computer 11 to a specified terminal 32 and also the transmission of upload data from said specified terminal 32 to said host computer 11 can each be carried out without confusion between different terminals in either case. The adoption of this configuration would enable, for example, (a) the transmission of download data from the host computer 11 to a specified terminal 32 and the return of upload data to the center to confirm the due arrival of said download data at said terminal 32, (b) the receipt by the center of music requests and instructions in the form of upload data from said terminal 32, and (c) the creation of a protocol that would enable error-free communication to be carried out between the host computer 11 and the terminal 32.

Moreover, since said bidirectional communication is carried out in the form off packet communication, a single channel can be used for more than one purpose at a time, thereby enabling terminal 32 control operations to be carried out without interruption to the music data service. Again, by making use of the multiple addressing capability or this communication device, it is possible to transmit data to all terminals simultaneously.

Furthermore, although the transmission of music data from the control device 11 to the terminal 32 in the preferred embodiment outlined above was carried out by means of MIDI data, it would be equally acceptable for transmission to be carried out by means of the PCM (pulse code modulation) method.

Broadcast data output by the first center unit has, moreover, been taken to be in digital signal form but it would be equally acceptable if it were in analog signal form. In this sort of case, the data switching unit would be positioned downstream of the first modem section and the broadcast data input directly to the data switching unit without routing it initially through the first modem section. The broadcast data extractor would also be connected to the telephone network directly rather than by way of the second modem section.

What is claimed is:

1. A device for bidirectional communication on a telephone line, said device making use of idle time on a telephone network, which connects the switching system of a telephone exchange with a telephone in a user's home, for the transmission of data from a center independent of said telephone exchange by way of said telephone network to said user's home,
said center being equipped with
control means which outputs download data and control signals, and receives upload data,
data switching means which establishes a communication sequence in accordance with said control signals received from said control means,
first packet transmission means which converts the download data received from said control means into packet form and outputs said packets to said data switching means,
first packet receiving means which receives signals from said telephone network, selects from amongst said signals, packets addressed to said control means, extracts upload data from said packets and outputs said upload data to said control means, and
first communication sequence control means which controls the sequence of incoming and outgoing communications in respect of said first packet transmission means and said first packet receiving means, and said user's home being equipped with a terminal which outputs upload data and which receives download data, second packet transmission means which converts upload data received from said terminal into packets which it outputs to the aforementioned telephone network, second packet receiving means which receives signals from said telephone network, selects from amongst said signals, packets addressed to the aforementioned terminal, extracts download data from said packets and outputs said download data to said terminal, and second communication sequence control means which controls the sequence of incoming and outgoing communications in respect of said second packet transmission means and said second packet receiving means.

2. The device for bidirectional communication according to claim 1 in which said center is further equipped with a center unit which outputs broadcast data, and a data switching means which receives output from said first packet transmission means and from said center unit and, on receipt of a control signal from the aforementioned control means, creates a communication window in said broadcast data, said window being used for the packet communication of the download data by means of the selective output either of said packets or of said broadcast data to the telephone network, and said user's home being further equipped with a broadcast data extraction means which receives said download data and extracts from it said broadcast data, and a home device which reproduces said broadcast data.

3. The device for bidirectional communication according to claim 2 in which said home device includes means for turning an exchange device installed in the telephone exchange on and off and selecting said center unit.

4. The device for bidirectional communication according to claim 1 in which the aforementioned download data includes MIDI data created in accordance with the MIDI standard, and in which the aforementioned terminal comprises a MIDI sound source which is driven by said MIDI data.

5. The device for bidirectional communication according to claim 1 in which said download data includes MIDI data and image data for use in connection with a karaoke system, and in which said terminal comprises a MIDI sound source, which is driven by said MIDI data, and an image device.

6. The device for bidirectional communication according to claim 1 in which said download data includes PCM data created by the PCM method.

7. The device for bidirectional communication according to claim 1 in which said first packet transmission means and said second packet transmission means each split up data received, insert flags and identifiers and reassemble said data in packet form.

8. The device for bidirectional communication according to claim 1 in which said first communication sequence control means transmits a positive acknowledge packet on receipt of an incoming packet in which it does not detect an error, on receipt of an incoming packet in which it detects an error, transmits a negative acknowledge packet to request retransmission of said incoming packet.

* * * * *